United States Patent
Miyamoto et al.

(10) Patent No.: US 7,206,781 B2
(45) Date of Patent: Apr. 17, 2007

(54) DATA REGISTRATION SYSTEM

(75) Inventors: Takashi Miyamoto, Asaka (JP); Arito Asai, Asaka (JP)

(73) Assignee: Fujifilm Corporation, Kanagawa (JP)

( * ) Notice: Subject to any disclaimer, the term of this patent is extended or adjusted under 35 U.S.C. 154(b) by 848 days.

(21) Appl. No.: 10/115,138

(22) Filed: Apr. 4, 2002

(65) Prior Publication Data

US 2002/0147908 A1    Oct. 10, 2002

(30) Foreign Application Priority Data

Apr. 4, 2001  (JP) ............................ 2001-105314

(51) Int. Cl.
  G06F 7/00   (2006.01)
  G06F 17/30  (2006.01)
  G06F 15/16  (2006.01)
(52) U.S. Cl. ............................. 707/9; 707/10; 709/203
(58) Field of Classification Search .................. 707/9; 709/203
See application file for complete search history.

(56) References Cited

U.S. PATENT DOCUMENTS 4,903,222  A  *  2/1990  Carter et al. ................ 361/680
5,903,878  A  *  5/1999  Talati et al. .................. 705/26
5,996,006  A  *  11/1999 Speicher ...................... 709/218
6,335,963  B1 *  1/2002  Bosco ...................... 379/88.12
6,341,353  B1 *  1/2002  Herman et al. ............. 713/201
2002/0006803 A1 *  1/2002  Mendiola et al. ........... 455/466
2002/0116381 A1 *  8/2002  Thompson ..................... 707/9

* cited by examiner

Primary Examiner—Don Wong
Assistant Examiner—Cheryl M Shechtman
(74) Attorney, Agent, or Firm—Birch, Stewart, Kolasch & Birch, LLP.

(57) ABSTRACT

An image file transmitted from a cellular telephone and a user ID indicative of the owner of the image file are associated with each other. To accomplish this, a database server is accessed by the cellular telephone and a connection is established to a Web page for registering image data, whereupon a unique ID is generated by the database server. An HTML file in which the generated unique ID is included as a mail address is generated and transmitted to the cellular telephone. E-mail to which image data has been attached is transmitted to a mail server at a destination specified by the mail address. The mail server detects the unique ID from the mail address. The user ID is found from the unique ID, and the user ID and image data are transmitted in associated form from the mail server to the database server. Image data in association with the user ID can be stored in a database by the database server.

10 Claims, 8 Drawing Sheets

*Fig. 4*

UNIQUE-ID TABLE

| USER NAME | USER ID | PIN | UNIQUE ID |
|---|---|---|---|
| TARO TOKKYO | aaaa | 12345 | To6870mC8995362340748841At |
| HANAKO JITUYO | bbbb | 67890 | Xo6870mC897836 23e4374841t |
| ICHIRO ISHO | cccc | 98765 | Zi6860mF899ds462340 7484134 |
| . . . | . . . | . . . | . . . |

*Fig. 7*

```
LINE
 1  <HTML>
 2  <BODY>
 3  <CENTER>
 4  <img src = "img/title.gif" width = "90" height = "32">
 5  <HR>

6  IF YOU ARE SENDING A PHOTOGRAPH BY MAIL, <BR>
 7  <A HREF = "mailto:To6870mC8995362340748 41At@webpic.net">
 8  CLICK HERE </A>!

9  </CENTER>
10  </BODY>
11  </HTML>
```

DATA REGISTRATION SYSTEM

BACKGROUND OF THE INVENTION

1. Field of the Invention

This invention relates to a data registration system, a database server constituting a data registration system, a method of controlling the operation of the database server, a portable electronic device and a method of controlling the operation thereof.

2. Description of the Related Art

It is presently possible to register data such as image data, music data and text data in a database server. Data that has been registered in a database server can be deleted or altered only by a registered user (the owner of the data). It is necessary, therefore, that the registered data and the user be associated with each other.

It is also possible to register data in a database server using a device such as a cellular telephone. When a cellular telephone is used, electronic mail (e-mail) must be utilized to register the data. That is, the database server is accessed using the cellular telephone. The data to be registered is then transmitted by e-mail to a mail server as an attached file. Data contained in the attached file of the e-mail is transmitted from the mail server to the database server, where the data is stored.

When data is thus registered in a database server using a cellular telephone, the data to be registered is transmitted to the mail server, which is different from the database server that registers the data. As a consequence, there are instances where it is difficult to associate the registered data and the user. For this reason, an ID for identifying the user is entered in the body or subject of the e-mail or the sender of the e-mail is registered in the database server beforehand, and the registered data and user are associated with each other by checking the sender of the e-mail. Regardless of which method is used, however, problems that need to be solved include imperfect security and a decline in user friendliness.

SUMMARY OF THE INVENTION

Accordingly, an object of the present invention is to enhance security and improve user friendliness even when e-mail is utilized to register data in a database server.

The present invention concerns a data registration system comprising a portable electronic device, a database server and a mail server that are capable of communicating with one another. First, user identification data for identifying the user of the portable electronic device is transmitted from the portable electronic device to the database server.

The database server comprises a user identification data receiving unit for receiving user identification data transmitted from the portable electronic device; a determination unit (determination means) for determining whether a user is an authorized user based upon the user identification data that has been received by the user identification data receiving unit; a unique ID generating unit (unique ID generating means) for generating a unique ID in response to a determination by the determination unit to the effect that the user is an authorized user (unique IDs are generated in advance and a selection may be made from these generated unique IDs); and a unique ID transmitting unit for transmitting data, which indicates the unique ID generated by the unique ID generating unit, to the portable electronic device.

The portable electronic device comprises a unique ID receiving unit for receiving data indicating a unique ID transmitted from the unique ID transmitting unit of the database server, and a first registration-target data transmitting unit for transmitting data, which is to be registered in the database server, by e-mail to an e-mail address specified by the unique ID indicated by the data indicating the unique ID received by the unique ID receiving unit.

The mail server includes a registration-target data receiving unit for receiving data transmitted by e-mail from the first registration-target data transmitting unit of the portable electronic device.

The present invention may be so adapted that the database server, the portable electronic device and the mail server are implemented in stand-alone fashion.

The present invention provides also a method of controlling the operation of the database server described above. Specifically, the method includes the steps of: receiving user identification data transmitted from a portable electronic device; determining whether a user is an authorized user based upon the user identification data that has been received; generating a unique ID in response to a determination to the effect that the user is an authorized user; and transmitting data, which indicates the unique ID generated, to the portable electronic device.

The present invention provides also a method of controlling the operation of the portable electronic device described above. Specifically, the present invention provides a method of controlling operation of a portable electronic device capable of communicating with a database server and a mail server, comprising the steps of: receiving data indicating a unique ID, which is transmitted to an authorized user, transmitted from the database server; and transmitting data, which is to be registered in the database server, by e-mail to an e-mail address of the mail server specified by the unique ID indicated by the received data indicating the unique ID.

In accordance with the present invention, user identification data [user ID, PIN (Personal Identification Number), etc.], which identifies the user of the portable electronic device, is transmitted from the portable electronic device to the database server.

When the user identification data is received by the database server, the latter determines whether the user is an authorized user. This determination processing makes it possible to prevent tampering because the user can be authenticated. When the user is determined to be an authorized user, a unique ID is generated in the database server. (A unique ID is generated whenever the database server is accessed if the user is a different user, as a matter of course, and even when the user is the same user. Naturally, in case of the same user, a user-specific ID may be decided without generating a unique ID whenever the database server is accessed.) The generated unique ID is transmitted from the database server to the portable electronic device.

Upon receiving the unique ID, the portable electronic device transmits data to be registered (image data, voice data, text data, etc.) in the database server by e-mail to the e-mail address of the mail server specified by this unique ID.

The mail server receives the data that is to be registered in the database server.

Upon receiving the data to be registered, the mail server registers the received data to be registered and the user ID in the database server in associated form.

Thus, registration-target data is registered in the database server in association with the user ID. Since a unique ID is generated in the database server, tampering by an unauthorized third party can be prevented. Further, the system is user friendly because it is unnecessary to store the address of the sender in advance.

The mail server may be further provided with a second registration-target data transmitting unit for transmitting the registration-target data, which has been received by the registration-target data receiving unit, and the data indicating the user ID to the database server in associated form.

In this case, the database server would include a second registration-target data receiving unit for receiving the registration-target data transmitted from the second registration-target data transmitting unit of the mail server and the data indicating the user ID, and a registration control unit for registering the registration-target data, which has been received by the second registration-target data receiving unit, in the database server in association with the user ID.

An arrangement may be adopted in which the unique ID transmitting unit of the database server incorporates the data indicating the unique ID in an HTML file in which the e-mail specified by the unique ID serves as hot text, and then transmits the file to the portable electronic device.

If the portable electronic device is one having a display unit (or if a display unit is connected to the portable electronic device), an image based upon the above-mentioned HTML file will be displayed. By clicking the hot text of the displayed image, data registered in the database server is transmitted to the e-mail address of the mail server.

Thus, the user of the portable electronic device can transmit data by e-mail without entering an e-mail address him/herself (i.e., without being aware of the e-mail address).

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 illustrates a table of unique IDs according to the present invention;

FIG. 7 shows an example of an HTML document; and

DESCRIPTION OF THE PREFERRED EMBODIMENTS

Figure 1:
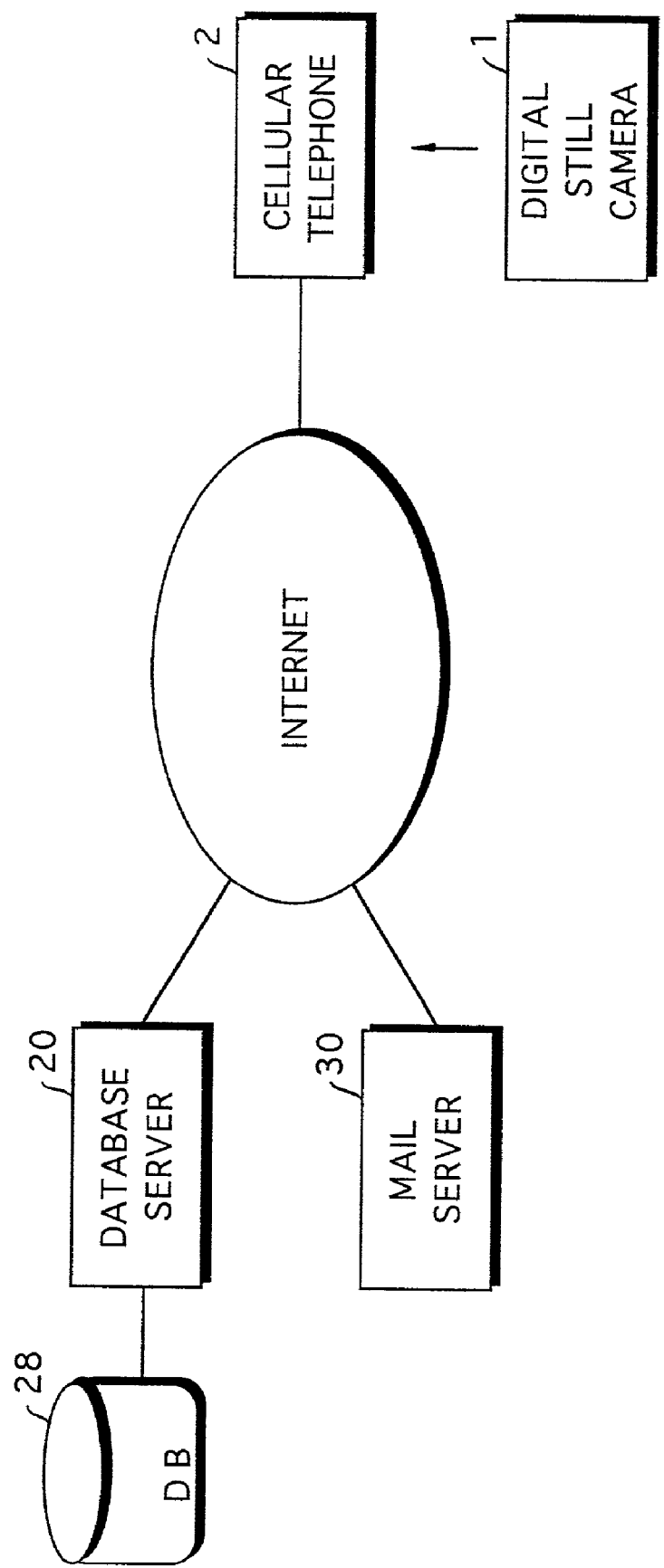
FIG. 1 is a diagram illustrating an overview of an image data registration system according to the present invention.

FIG. 1 illustrates an overview of an image data registration system according to a preferred embodiment of the present invention.

A cellular telephone 2, a database server 20 and a mail server 30 are capable of communicating with one another via the Internet. A database 28 for storing image data to be registered is connected to the database server 20. Image data that has been captured by a digital still camera 1 is applied to the cellular telephone 2.

In the data registration system according to this embodiment, a Web page, which is for registering image data, of the database server 20 is accessed by the cellular telephone 2 and whether the user is an authorized user is authenticated. If the user is authenticated as an authorized user, e-mail to which an image file containing image data to be registered has been attached as an attached file is transmitted from the cellular telephone 2 to the mail server 30. Image data contained in the image file attached to the e-mail is applied to the database server 20 from the mail server 30 and is stored in the database 28. The details of this operation will be set forth below.

Figure 2:
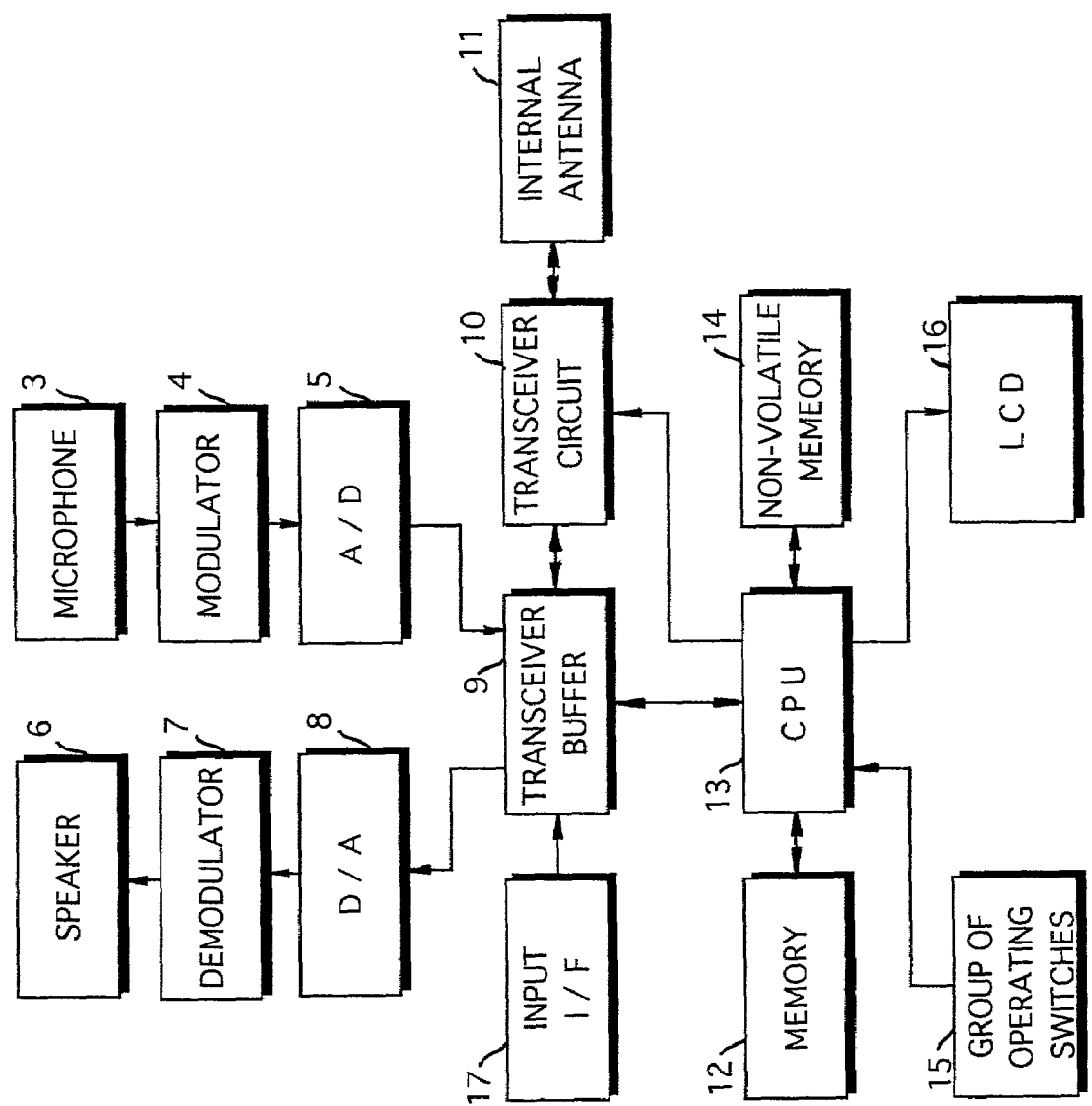
FIG. 2 is a block diagram illustrating the electrical structure of a cellular telephone according to the present invention.

FIG. 2 is a block diagram illustrating the electrical structure of the cellular telephone 2.

The overall operation of the cellular telephone 2 is controlled by a CPU 13.

A non-volatile memory 14 in which the program of the cellular telephone 2 and other data has been stored and a memory 12 for storing prescribed data are connected to the CPU 13. Output signals from a group 15 of operating switches enter the CPU 13. Further, the cellular telephone 2 is provided with a liquid crystal display unit 16 for displaying telephone numbers, images, etc.

Voice applied to a microphone 3 is converted to an electrical voice signal by a modulation circuit 4. The voice signal obtained by the conversion is converted to digital voice data by an analog/digital conversion circuit 5. The digital voice data is applied to a transceiver circuit 10 via a transceiver buffer 9 and is transmitted from an internal antenna 11 by the transceiver circuit 10.

Voice data that has been transmitted from another cellular telephone or the like is received by the transceiver circuit 10 via the internal antenna 11. The received voice data is converted to an analog voice signal by a digital/analog conversion circuit 8 via the transceiver buffer 9. The analog voice signal is demodulated by a demodulation circuit 7 and is delivered as a voice output from a speaker 6.

The cellular telephone 2 is capable of sending and receiving image data as well. The cellular telephone 2 is provided with an input interface 17 to which image data is input. Image data that has entered from the input interface 17 (the image data is provided by, e.g., the digital still camera 1, as mentioned above) is stored temporarily in the transceiver buffer 9. Image data that has been read out of the transceiver buffer 9 is transmitted from the internal antenna 11 by the transceiver circuit 10.

Image data that has been received by the transceiver circuit 10 via the internal antenna 11 is stored temporarily in the transceiver buffer 9. The image data is read out of the transceiver buffer 9 and applied to the liquid crystal display unit 16. The image represented by the received image data is displayed.

Figure 3:
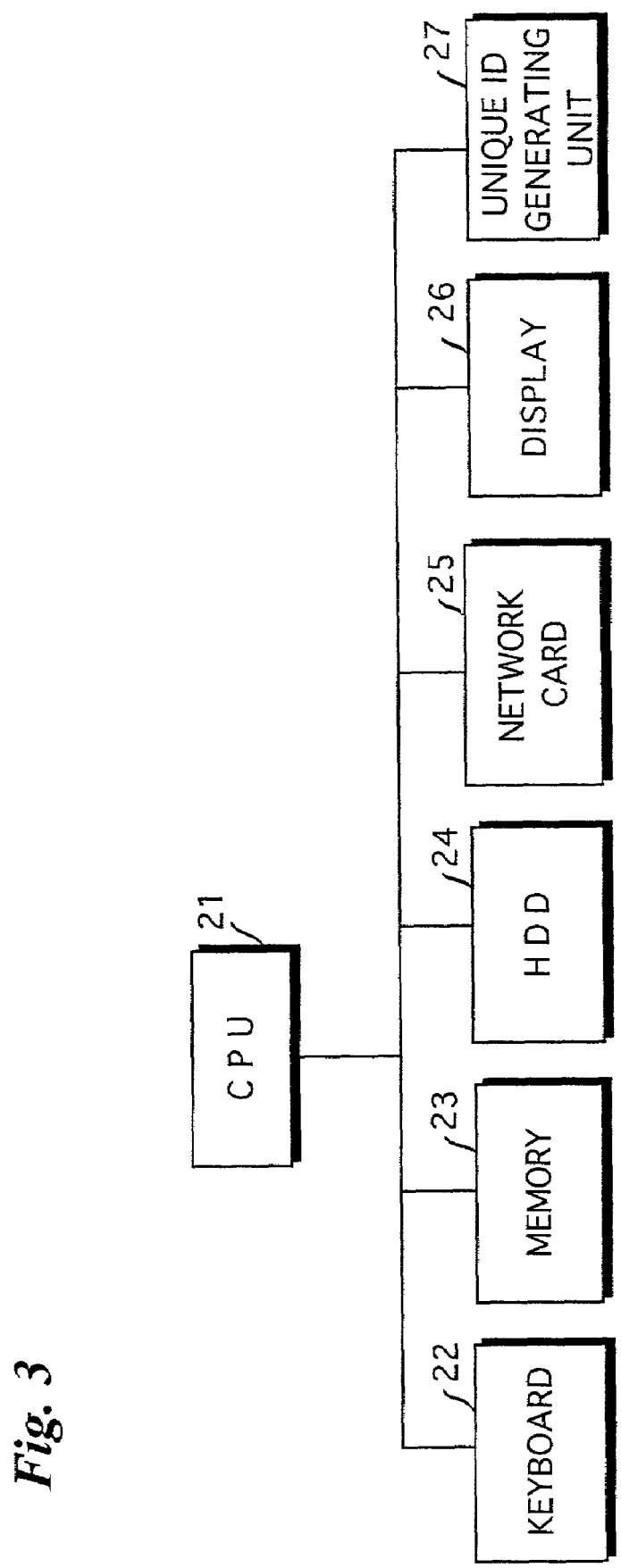
FIG. 3 is a block diagram illustrating the electrical structure of a database server.

FIG. 3 is a block diagram illustrating the electrical structure of the database server 20.

The overall operation of the database server 20 is controlled by a CPU 21.

Connected to the database server 20 are a keyboard 22 for applying various commands, a memory 23 for storing a table of unique IDs and other prescribed data, a hard-disk drive 24, a network card 25 for connecting to the Internet, a display unit 26 and a unique ID generating unit 27.

The unique ID generating unit 27 generates a unique ID in response to being accessed from the cellular telephone 2, as will be described in detail below. The unique ID generating unit 27 generates a unique ID whenever it is accessed, irrespective of whether the user is the same user each time.

FIG. 4 illustrates the table of unique IDs.

User names, user IDs, user PINs and unique IDs are stored in the table on a user-by-user basis. Whenever a unique ID is issued, a user name, user ID and PIN are stored in association with the unique ID. As will be described later, each item of data in the unique ID table is stored until the image data transmitted from the user is registered in the database 28. When the image data has been registered in the database 28, the corresponding user name, user ID, PIN and unique ID are cleared.

Figure 5:
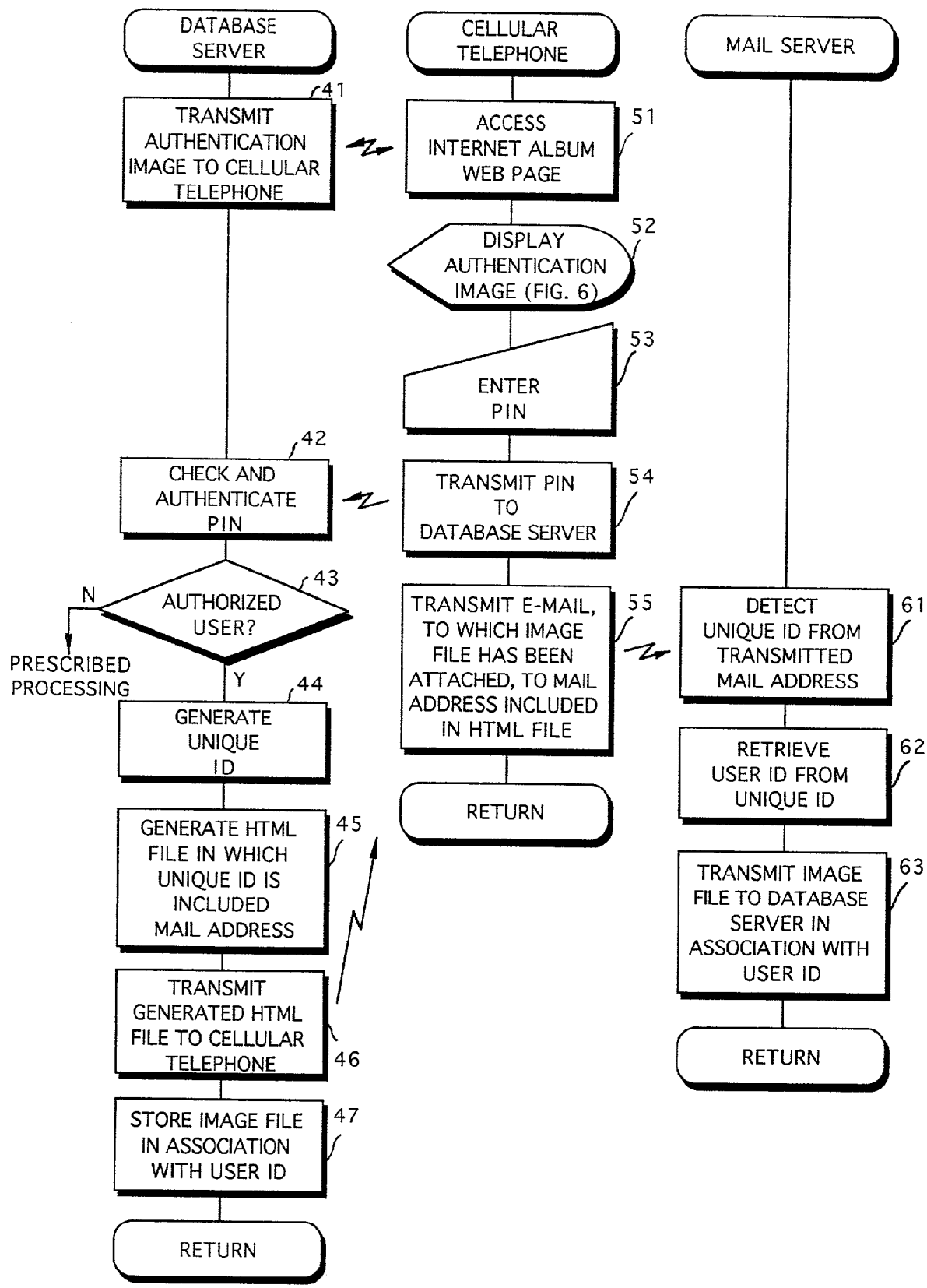
FIG. 5 is a flowchart illustrating processing executed by the image data registration of the present invention.

FIG. 5 is a flowchart illustrating processing executed by the image registration system.

It will be assumed that image data to be registered in the database 28 has been applied to the cellular telephone 2 by the digital still camera 1.

An Internet album Web page (a Web page for registering image data in the database 28) possessed by the database server 20 is accessed using the cellular telephone 2 (step 51).

If communication is established between the cellular telephone 2 and the database server 20, data representing an authentication image is transmitted from the database server 20 to the cellular telephone 2 (step 41).

When the image data representing the authentication image transmitted from the database server 20 is received by the cellular telephone 2, the authentication image is displayed on the display screen of the display unit 16 of cellular telephone 2 (step 52).

Figure 6:
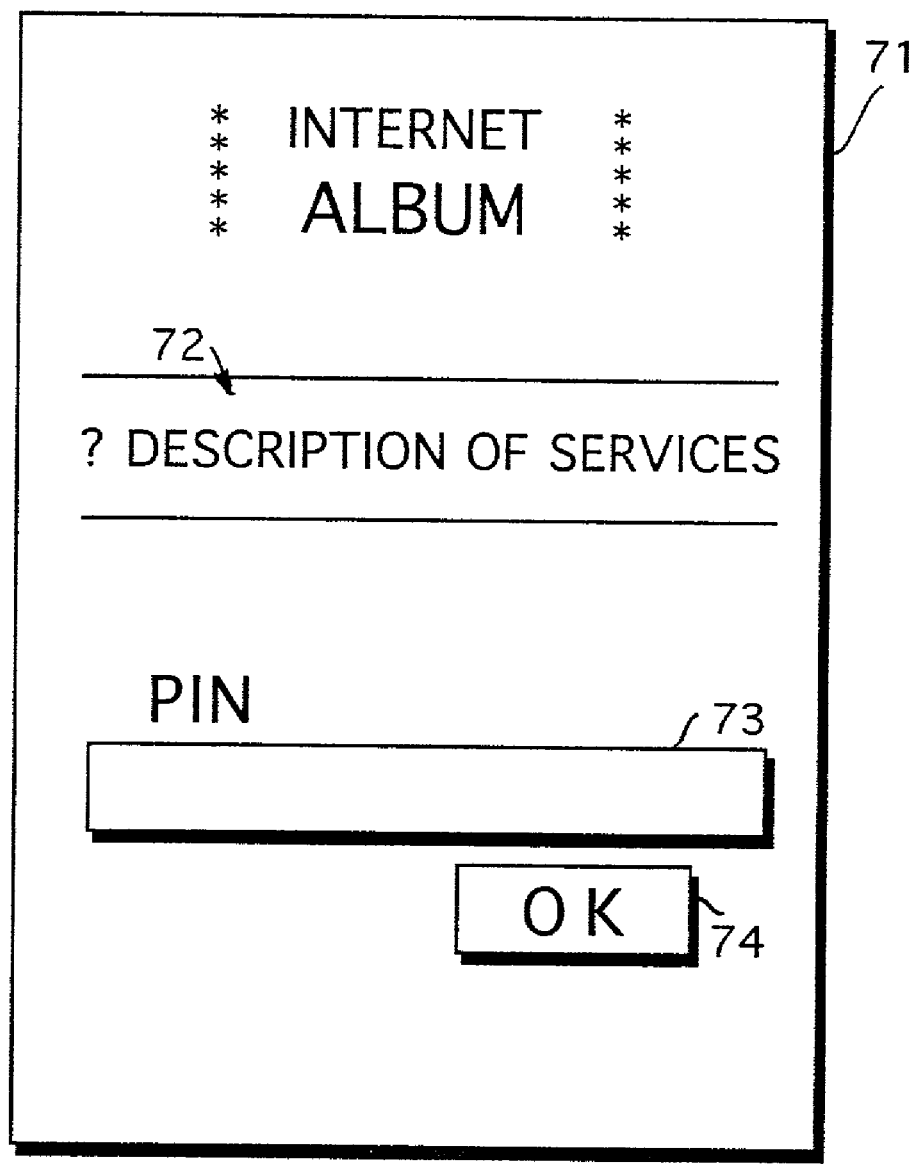
FIG. 6 shows an example of an image displayed on the cellular telephone in this invention.

FIG. 6 illustrates an example of the authentication image.

A question area 72 for displaying a description of services is formed at the upper part of a display screen 71 on the display unit 16 of cellular telephone 2. The user selects the question area 72 by employing the group 15 of operating switches. When an ENTER button among the group 15 of operating switches is pressed, a service description image appears on the display screen 71.

A box 73 for entering a PIN is formed on the lower part of the display screen 71 on the display unit 16 of cellular telephone 2. The box 73 is selected using the group 15 of operating switches of the cellular telephone 2. A PIN is subsequently entered using a ten-key pad included in the group 15 of operating switches (step 53). The entered PIN is displayed in the box 73. Of course, an arrangement may be adopted in which asterisks are displayed in the box 73 in response to an input so that another party will be able to see the entered PIN.

An OK area 74 is formed below the box 73. If the PIN that has been entered in the box 73 correct, the OK area 74 is selected by the user and the ENTER button among the group 15 of operating switches is pressed. When this is done, data representing the PIN entered by the user is transmitted from the cellular telephone 2 to the database server 20 (step 54).

The database server 20 receives the data representing the PIN transmitted from the cellular telephone 2. On the basis of the PIN represented by the received PIN data, the database server 20 executes authentication processing for determining whether the user who accessed the database server 20 is an authorized user (step 42). It goes without saying that a user-specific authentication table has been stored in the database server 20 in correspondence with the PIN and that the authentication processing is executed by referring to this authentication table.

If the authentication processing verifies that the user is an authorized user ("YES" at step 43), a unique ID is generated by the unique ID generating unit 27 of database server 20 (step 44). When the unique ID is generated, the generated unique ID is stored in the user ID table is correspondence with the user name, user ID and PIN, as shown in FIG. 4. It goes without saying that the user name and user ID have been stored in the database server 20 in association with the PIN.

When the unique ID has been generated, an HTML file in which this unique ID is included as a mail address is generated (step 45).

In this example, it is assumed that a unique ID "To6870mC899536234074841At" is generated. The domain name of the Web page is assumed to be "webpic.net". The mail server 30 is configured so as to accept a mail address "To6870mC899536234074841At@webpic.net".

FIG. 7 shows an example of an HTML document for creating an HTML (HyperText Markup Language) file.

Line 1 is a start tag indicative of an HTML document and line 11 is an end tag indicative of the HTML document. Line 2 is a start tag indicating the body of the HTML document, and line 10 is an end tag indicating the body of the HTML document. Line 3 is a centering start tag and line 9 a centering end tag. Line 4 indicates that a title image (an image portion 75 of an Internet album shown in FIG. 8, described later) is to be loaded on the Web page. Line 4 further indicates the width and height of the title image.

Line 5 is a tag that specifies a horizontal line. Line 6 indicates the content of text displayed on the Web page and that a new line will start in response to end of the text. Line 7 is for linking to another file. Here the unique ID that has been generated is marked up as a mail address. The "HERE" text on line 8 is made hot text by line 7.

The file defined by such HTML is transmitted from the database server 20 to the cellular telephone 2 (step 46).

Figure 8:
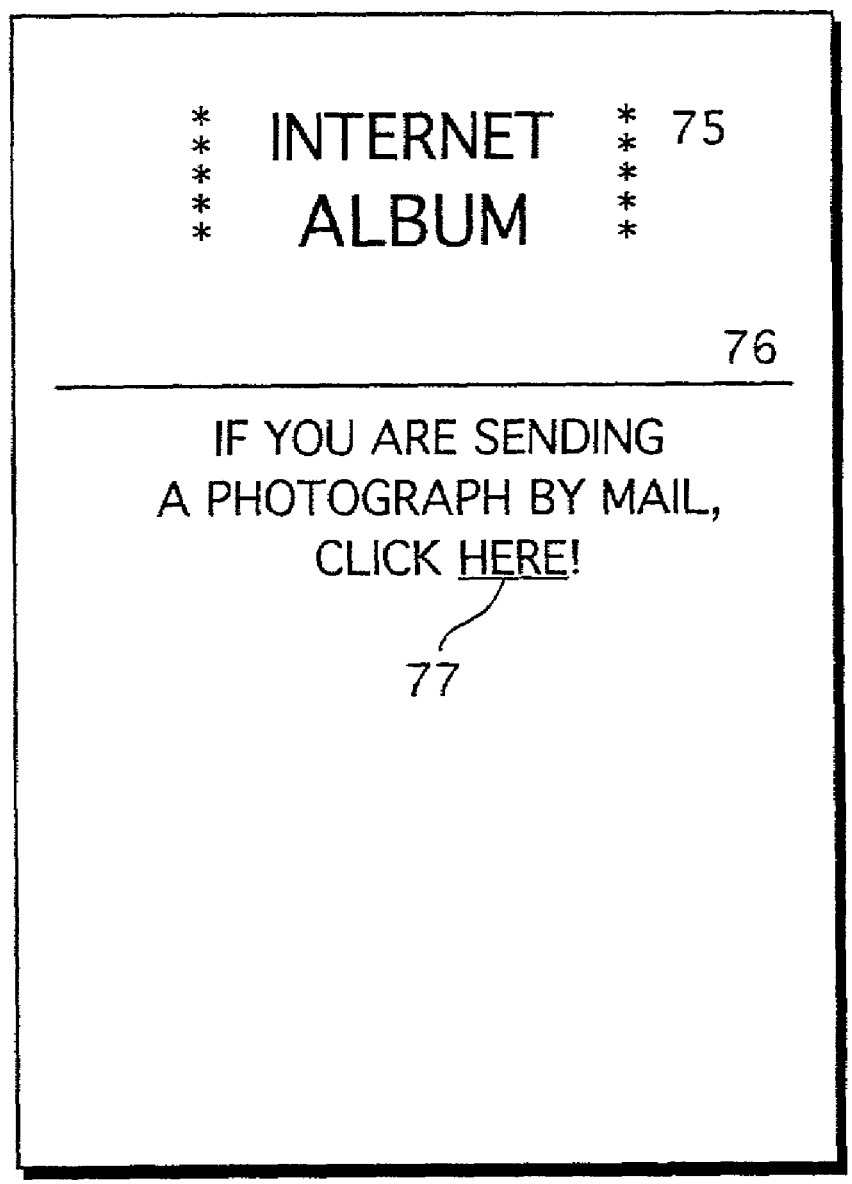
FIG. 8 shows another example of an image displayed on the cellular telephone in this invention.

When the HTML file that has been transmitted from the database server 20 is received by the cellular telephone 2, a mail transmission image is displayed on the display screen 71 of display unit 16 on cellular telephone 2, as shown in FIG. 8.

In FIG. 8, a title image 75 represented by the above-described HTML (line 4 in FIG. 7) is displayed at the upper part of the mail transmission image. Further, text 76 represented by the above-described HTML (lines 6 to 8 in FIG. 7) is displayed below the title image. The text 76 includes hot text (the characters "HERE") 77 (lines 7 and 8 in FIG. 7). If the hot text indicated by "HERE" is clicked, e-mail will be transmitted to the mail address that is the link destination of the hot text 77.

The hot text 77 is clicked by the user. When this is done, the e-mail to which is attached the image file containing the image data to be stored in the database 28 is transmitted to the mail address specified by the hot text 77 (step 55). It goes without saying that the image file to be transmitted is attached to the e-mail in advance.

The e-mail that has been transmitted to the mail address specified by the hot text 77 is received by the mail server 30. The unique ID is detected from the mail address of the received e-mail (step 61). When the unique ID is detected, the user ID is retrieved by referring to the unique ID table (step 62). The user ID that has been retrieved and the image file attached to the e-mail is transmitted from the mail server 30 to the database server 20 in mutually associated form (e.g., as by being placed in the same folder) (step 63).

The user ID and the image file are received by the database server 20, which proceeds to store the image file (image data) in the database 28 in association with the user ID.

In the above-described embodiment, the user ID is retrieved from the unique ID by the mail server 30. However, an arrangement may be adopted in which the user ID is retrieved from the unique ID by the database server 20. In such case the unique ID and the image file would be transmitted from the mail server 30 to the database server 20 in associated form.

Thus, the user ID and the image file can be correlated and stored in the database 28. The user need not be aware of or enter the mail address "To6870mC899536234074841At@webpic.net".

Furthermore, though image data is registered in the above-described embodiment, the present invention is applicable not only in a case where image data is registered but also in a case where voice data and text data, etc., are registered.

Further, though the above embodiment is implemented by hardware, a software implementation also is possible.

As many apparently widely different embodiments of the present invention can be made without departing from the spirit and scope thereof, it is to be understood that the invention is not limited to the specific embodiments thereof except as defined in the appended claims.

What is claimed is:

1. A data registration system comprising a portable electronic device, a database server and a mail server that are capable of communicating with one another, wherein user identification data for identifying a user of said portable electronic device is transmitted from said portable electronic device to said database server, said database server comprising:
   a user identification data receiving unit for receiving user identification data transmitted from said portable electronic device;
   a determination unit for determining whether the user is an authorized user based upon the user identification data that has been received by said user identification data receiving unit;
   a unique ID generating unit for generating a unique ID in response to a determination by said determination unit to the effect that the user is an authorized user;
   a file generating unit for generating a file including an e-mail address, which includes the unique ID generated by said unique ID generating unit; and
   a file transmitting unit for transmitting the file generated by said file generating unit, to said portable electronic device;
   said portable electronic device comprises:
   a file receiving unit for receiving the file transmitted form said file transmitting unit of said database server; and
      a first registration-target data transmitting unit for transmitting data, which is to be registered in said database server, by e-mail to an e-mail address included in the file received by said file receiving unit; and
   said mail server comprises a registration-target data receiving unit for receiving data transmitted by e-mail from said first registration-target data transmitting unit of said portable electronic device.

2. The system according to claim 1, further comprising a registration control unit for registering the registration-target data, which has been received by said registration-target data receiving unit, in said database server in association with the user ID.

3. The system according to claim 1, wherein said mail server further comprises a second registration-target data transmitting unit for transmitting the registration-target data, which has been received by said registration-target data receiving unit, and the data indicating the user ID to said database server in associated form; and said database server further comprises:
   a second registration-target data receiving unit for receiving the registration-target data transmitted from said second registration-target data transmitting unit of said mail server and the data indicating the user ID; and
   a registration control unit for registering the registration-target data, which has been received by said second registration-target data receiving unit, in said database server in association with the user ID.

4. The system according to claim 1, wherein said file generating unit of said database server generates an HTML file including the e-mail address as hot text.

5. The system according to claim 1, wherein said portable electronic device is a cellular phone.

6. The system according to claim 1, wherein said database server further comprises a unique ID memory device for memorizing a unique ID generated by said unique ID generating device corresponding to the user identification data;

said mail server further comprises:
   a unique ID detection device for detecting the unique ID from the e-mail address;
   a user identification data detection device for detecting the user identification data from the unique ID detected by said unique ID detection device; and
   a user identification/registration-target data transmitting device for transmitting the user identification data detected by said user identification data detecting device and the registration-target data received by said registration-target data receiving unit to said database server in associated form; and said database server further comprises:
   a user identification/registration-target data memory device for memorizing the user identification data and the registration-target data transmitted from said user identification/registration-target data transmitting device in associated form; and
   a unique ID erasing device for erasing the unique ID corresponding to the user identification data memorized to said user identification/registration-target data memory device from the unique ID memorized to said unique ID memory device in response to memorized the user identification data and the registration-target data to said user identification/registration-target data in associated form.

7. A database server comprising:
   a user identification data receiving unit for receiving user identification data transmitted from a portable electronic device;
   a determination unit for determining whether the user is an authorized user based upon the user identification data that has been received by said user identification data receiving unit;
   a unique ID generating unit for generating a unique ID in response to a determination by said determination unit to the effect that the user is an authorized user; and
   a file generating unit for generating a file including an e-mail address, which includes the unique ID generated by said unique ID generating unit; and
a file transmitting unit for transmitting the file generated by said file generating unit, to said portable electronic device.

8. A portable electronic device capable of communicating with a database server and a mail server, comprising:

a file receiving unit for receiving a file including an e-mail address having a unique ID, which is transmitted to an authorized user from said database server; and a registration-target data transmitting unit for transmitting data, which is to be registered in said database server, by e-mail to an e-mail address included in the file received by said file receiving unit.

9. A method of controlling operation of a database server, comprising the steps of:

receiving user identification data transmitted from a portable electronic device;

determining whether a user is an authorized user based upon the user identification data that has been received;

generating a file including an e-mail address, which has the generated unique ID; and transmitting the file to said portable electronic device.

10. A method of controlling operation of a portable electronic device capable of communicating with a database server and a mail server, comprising the steps of:

receiving a file including an e-mail address having a unique ID, which is transmitted to an authorized user, transmitted form said database server; and transmitting data, which is to be registered in said database server, by e-mail to an e-mail address included in the received file.

* * * * *